Feb. 14, 1950 — C. S. SULLIVAN — 2,497,826

SALES PRESENTATION KIT

Filed Nov. 3, 1948

INVENTOR.
CYRIL S. SULLIVAN
BY
Florian G. Miller
Atty.

Patented Feb. 14, 1950

2,497,826

UNITED STATES PATENT OFFICE 2,497,826

SALES PRESENTATION KIT

Cyril S. Sullivan, Erie, Pa.

Application November 3, 1948, Serial No. 58,111

4 Claims. (Cl. 35—1)

This invention relates to a sales presentation kit which may be carried in a salesman's pocket to enable him to make a sales presentation in an orderly and a logical manner and one which will create interest in the prospective buyer.

It is now customary for a salesman, and particularly insurance salesmen, to carry one or more books to refer to when selling to a prospective client. These books are merely reference books and no data is given for making a logical sales presentation. Since a book is generally in the salesman's hand, it creates no interest in the prospective buyer and when the salesman begins to thumb through the book, he loses his trend of thought and he duplicates some parts of the presentation and forgets others with the result that interest in the sales presentation lags or becomes non-existent on the part of the prospective buyer. In selling, the determination of the needs of the prospective buyer is of first importance. Reference to particular rates, prices, and the like are only of secondary importance. When a salesman is not actually engaged in selling to prospective buyers, many instances arise where he is in a position or requested to give a sales presentation. The result is a very disorderly sales presentation with many parts thereof deleted. Furthermore, if a salesman does not have to continually think of an outline for his sales presentation, he is better able to explain and sell his product or service and he can better ascertain the needs of the prospective buyer. I have utilized the normal interest of people in cubes by placing indicia thereon and throwing them in front of the prospective buyer. These cubes are all of a size and shape which are generally used to play games. The indicia on the cubes are such that they present a complete outline of an orderly and logical sales presentation and a container is provided so that each cube may be placed in the container after each subject designated on the cubes has been pursued thereby preventing duplication of any part of the presentation and very materially cutting down the time taken for the presentation and that of the prospective buyer.

It is, accordingly, an object of my invention to provide a novel sales presentation kit which is simple in construction, economical in cost, economical in manufacture, and efficient in use.

Another object of my invention is to provide a plurality of cubes having indicia thereon encased in an elongated tubular member which may be carried in the pocket of a salesman to create interest in the sales presentation and furthermore provide an orderly and logical outline for the sales presentation.

Another object of my invention is to provide a unitary salesman's kit with a pencil.

Another object of my invention is to provide a sales presentation kit which utilizes the normal interest of people in tangible objects placed before them.

Another object of my invention is to save the time of a salesman and a prospective buyer.

Another object of my invention is to provide a salesman's kit which ascertains the need of a prospective buyer in a minimum of time.

Other objects of my invention will become evident from the following detailed description, taken in conjunction with the accompanying drawings, in which Fig. 1 is a longitudinal, vertical sectional view of my novel sales presentation kit;

Figure 1:
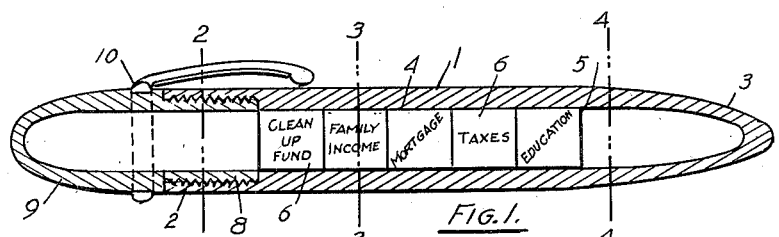
Figure 2:
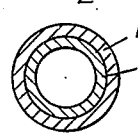
Fig. 2 is a view taken on the line 2—2 of Fig. 1.
Figure 3:
Fig. 3 is a view taken on the line 3—3 of Fig. 1.
Figure 4:
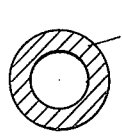
Fig. 4 is a view taken on the line 4—4 of Fig. 1.
Figure 5:
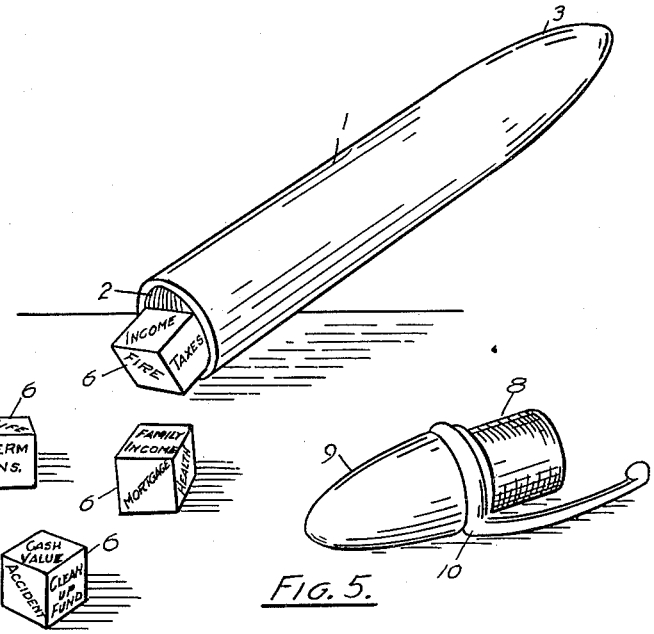
Fig. 5 is a diagrammatical view of my novel kit with the cap thereon removed and the cubes therein ejected from the recess therein.

Referring now to the drawings, I show in Figs. 1 to 5 inclusive an elongated tubular member 1 internally threaded at 2 and having a closed tapered end 3, the tubular member 1 simulating the general shape of a fountain pen or pencil. The tubular member 1 has a longitudinally extending recess 4 of rectangular cross-section with a shoulder 5 formed at the base thereof for seating a plurality of blocks or cubes 6 disposed in the recess 4 of the tubular member 1. The threaded projecting portion 8 or a rounded, closed, tubular shaped cap 9 is threadably engaged with the threaded portion 2 of the tubular member 1. A conventional spring clip 10 is disposed on the cap 9 for detachably securing the tubular member 1 and cap 9 in a pocket.

For the purposes of illustration, I have shown the cubes 6 having the designations: education, taxes, mortgage, family income, and clean-up fund, these designations being particularly adapted for a sales presentation of an insurance salesman. Any appropriate indicia may be imprinted on the cubes 6.

In utilizing my novel sales presentation kit, the cap 9 is removed and the cubes 6 are thrown on a table in front of the prospective buyer whereby his attention is obtained immediately because of the tangible objects in front of him.

The needs of the prospective buyer are then determined by referring to the indicia on the cubes 6 in any orderly arrangement desired. After the indicia on each cube has served its purpose, it is placed in the recess 4 of the tubular member 1 so that the sales presentation as to the indicia outlined on the particular tube is not duplicated. After the needs of the prospective buyer are determined, a book can then be referred to at the particular time or at a later time to ascertain any specific information such as prices, costs, rates, etc.

It will be evident that an outline for any sales presentation may be placed on the cubes 6 as it is desired. My novel kit is particularly useful in a field such as the insurance field where thousands of insurance agents are trained every year and reference indicia is required if they are to present an orderly sales presentation and minimize the time they consume of a prospective buyer.

Figure 6:
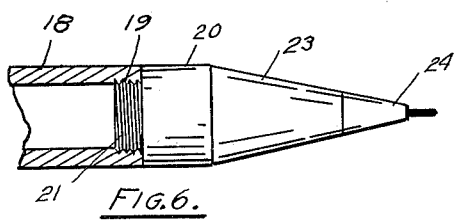
Fig. 6 is a vertical sectional view of a modified form of my novel sales presentation kit.

In Fig. 6, I have shown a modified form of my invention wherein an open tubular member 20 has a reduced threaded portion 21 on the closed end thereof for engaging the internally threaded portion 22 of a tapered casing 23 for a mechanical pencil 24. The cubes 25 in the recess 26 will be carried the same as in Fig. 1 and a cap and clip will also be provided as shown in Fig. 1. In this modification, the salesman also has a pencil as well as his sales presentation kit which can be carried in his pocket.

It will be evident from the foregoing description that I have provided a novel sales presentation kit which creates interest in a prospective buyer, which presents an outline in logical and orderly form for a sales presentation, which prevents duplication of particular points in a sales presentation, which may be carried in a vest pocket in the same manner as a fountain pen or pencil with a clip, one which has a distinctive appearance in the pocket of a salesman, and one which gives the salesman a kit at all times.

Various changes may be made in the specific embodiment of my invention without departing from the spirit thereof or from the scope of the appended claims.

What I claim is:

1. A sales presentation kit comprising a tubular member having a longitudinally extending recess of rectangular cross-section, a series of blocks encased in said recess in said tubular member having indicia on the sides thereof so arranged as to comprise in combination with the remainder of the blocks an outline of a sales presentation, the sides of said recess being straight so as to permit said blocks to be slid out of said tubular member when said tubular member is tilted upwardly, and a rounded tubular cap disposed on the open end of said tubular member.

2. A sales presentation kit as set forth in claim 1 wherein the closed end of said tubular member is threaded and adapted to threadably engage the threaded end of a mechanical pencil.

3. A sales presentation kit comprising a plurality of cubical blocks, each block having indicia on the sides thereof so arranged as to comprise in combination with the remainder of the blocks an outline of a sales presentation, said blocks being encased in an elongated rectangular shaped recess in a tubular member and adapted to be slid therefrom in columns when said tubular member is tilted upwardly.

4. A sales presentation kit comprising a plurality of cubical blocks encased in an elongated, rectangular shaped recess in a tubular member, each block having indicia on the sides thereof so arranged as to comprise in combination with the remainder of the blocks an outline of a sales presentation, said blocks being adapted to be thrown from said tubular member.

CYRIL S. SULLIVAN.

REFERENCES CITED

The following references are of record in the file of this patent:

UNITED STATES PATENTS

| Number | Name | Date |
|---|---|---|
| 2,060,406 | Tiede | Nov. 10, 1936 |
| 2,354,402 | Petruccione | July 25, 1944 |